(12) United States Patent
Heap et al.

(10) Patent No.: US 8,775,038 B2
(45) Date of Patent: Jul. 8, 2014

(54) METHOD AND APPARATUS FOR SELECTING AN ENGINE OPERATING STATE FOR A MULTI-MODE POWERTRAIN SYSTEM

(75) Inventors: Anthony H. Heap, Ann Arbor, MI (US); Kee Yong Kim, Ann Arbor, MI (US); Samantha Victoria Lado, Pittsfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 13/568,083

(22) Filed: Aug. 6, 2012

(65) Prior Publication Data
US 2014/0039770 A1 Feb. 6, 2014

(51) Int. Cl.
*B60K 17/06* (2006.01)

(52) U.S. Cl.
USPC .................................. 701/54; 701/22

(58) Field of Classification Search
USPC .................................... 701/54, 22
See application file for complete search history.

(56) References Cited

U.S. PATENT DOCUMENTS

| 7,645,206 | B2 | 1/2010 | Holmes et al. | |
|---|---|---|---|---|
| 2009/0118942 | A1* | 5/2009 | Hsieh et al. | 701/54 |
| 2009/0118952 | A1* | 5/2009 | Heap et al. | 701/56 |
| 2010/0179009 | A1 | 7/2010 | Wittkopp et al. | |

OTHER PUBLICATIONS

U.S. Appl. No. 13/570,175, unpubl, Lado, et al.
U.S. Appl. No. 13/569,929, unpubl, Diaz, et al.
U.S. Appl. No. 13/568,086, unpubl, Heap, et al.
U.S. Appl. No. 13/568,070, unpubl, Heap, et al.
U.S. Appl. No. 13/571,070, unpubl, Heap, et al.
U.S. Appl. No. 13/568,071, unpubl, Kim, et al.
U.S. Appl. No. 13/568,083, unpubl, Heap, et al.

\* cited by examiner

*Primary Examiner* — Mary Cheung
*Assistant Examiner* — Yuen Wong

(57) ABSTRACT

A method for operating a powertrain system including a multi-mode transmission configured to transfer torque among an engine, torque machines, and a driveline, includes executing a first search to determine a first engine operating point within an all-cylinder state and a corresponding operating cost for operating the powertrain system in response to an output torque request. A second search is executed to determine a second engine operating point within a cylinder deactivation state and a corresponding operating cost for operating the powertrain system in response to the output torque request. One of the first and second engine operating points is selected as a preferred engine operating point based upon the operating costs and the engine is controlled at the preferred engine operating point in the corresponding one of the all-cylinder state and the cylinder deactivation state.

12 Claims, 4 Drawing Sheets

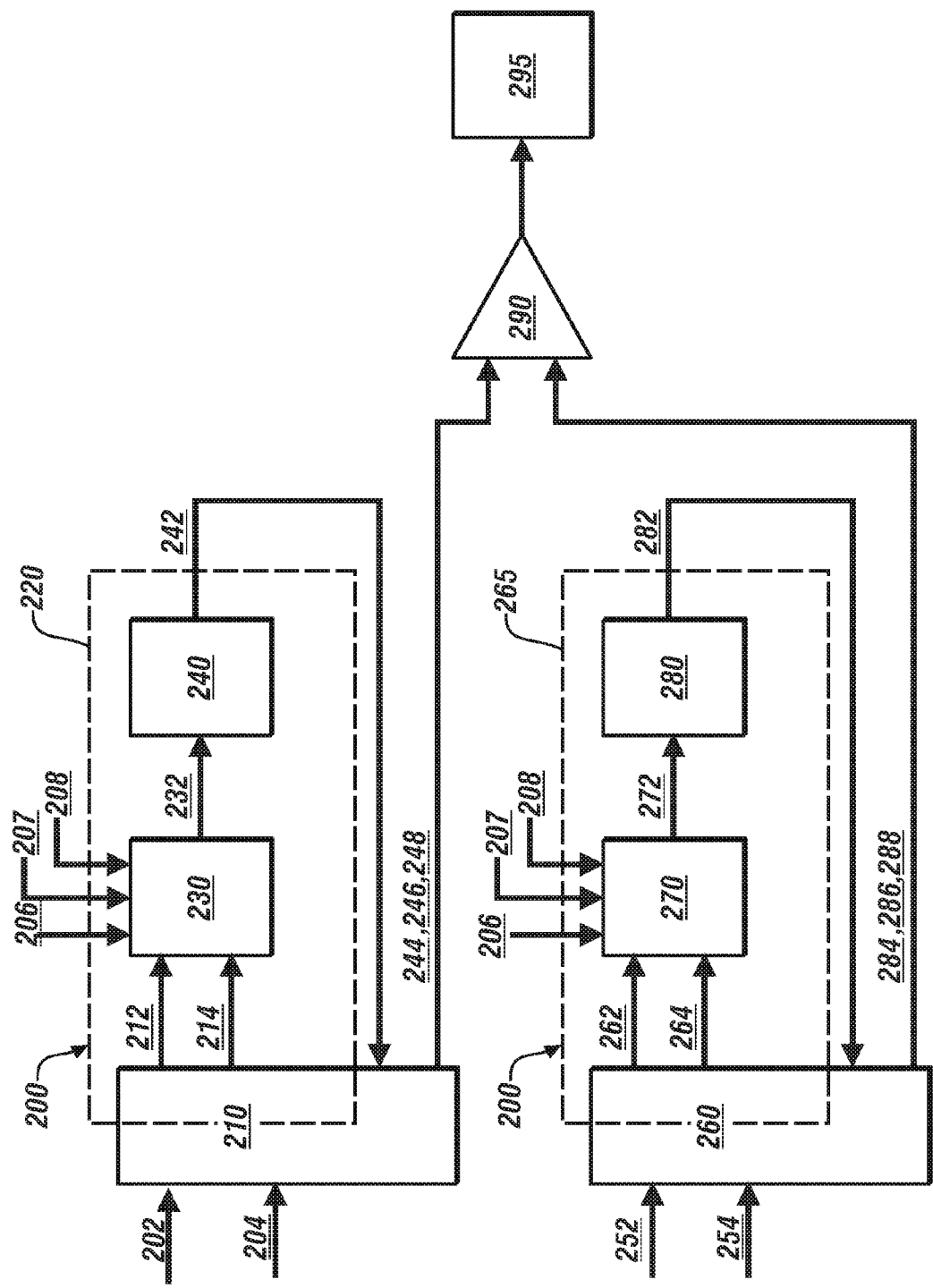

METHOD AND APPARATUS FOR SELECTING AN ENGINE OPERATING STATE FOR A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed. Known internal combustion engines can be configured to operate in an all-cylinder state and a cylinder deactivation state.

SUMMARY

A method for operating a powertrain system including a multi-mode transmission configured to transfer torque among an engine, torque machines, and a driveline, includes executing a first search to determine a first engine operating point within an all-cylinder state and a corresponding operating cost for operating the powertrain system in response to an output torque request. A second search is executed to determine a second engine operating point within a cylinder deactivation state and a corresponding operating cost for operating the powertrain system in response to the output torque request. One of the first and second engine operating points is selected as a preferred engine operating point based upon the operating costs and the engine is controlled at the preferred engine operating point in the corresponding one of the all-cylinder state and the cylinder deactivation state.

BRIEF DESCRIPTION OF THE DRAWINGS

One or more embodiments will now be described, by way of example, with reference to the accompanying drawings, in which:

FIG. 2 illustrates a search scheme that employs a search space to converge to a preferred engine speed and a preferred engine load, in accordance with the disclosure;

FIG. 3-1 illustrates an all-cylinder speed/load space for operating an embodiment of the engine in the all-cylinder state, in accordance with the disclosure;

FIG. 3-2 illustrates a cylinder deactivation speed/load space for operating an embodiment of the engine in the cylinder deactivation state, in accordance with the disclosure.

DETAILED DESCRIPTION

Figure 1:
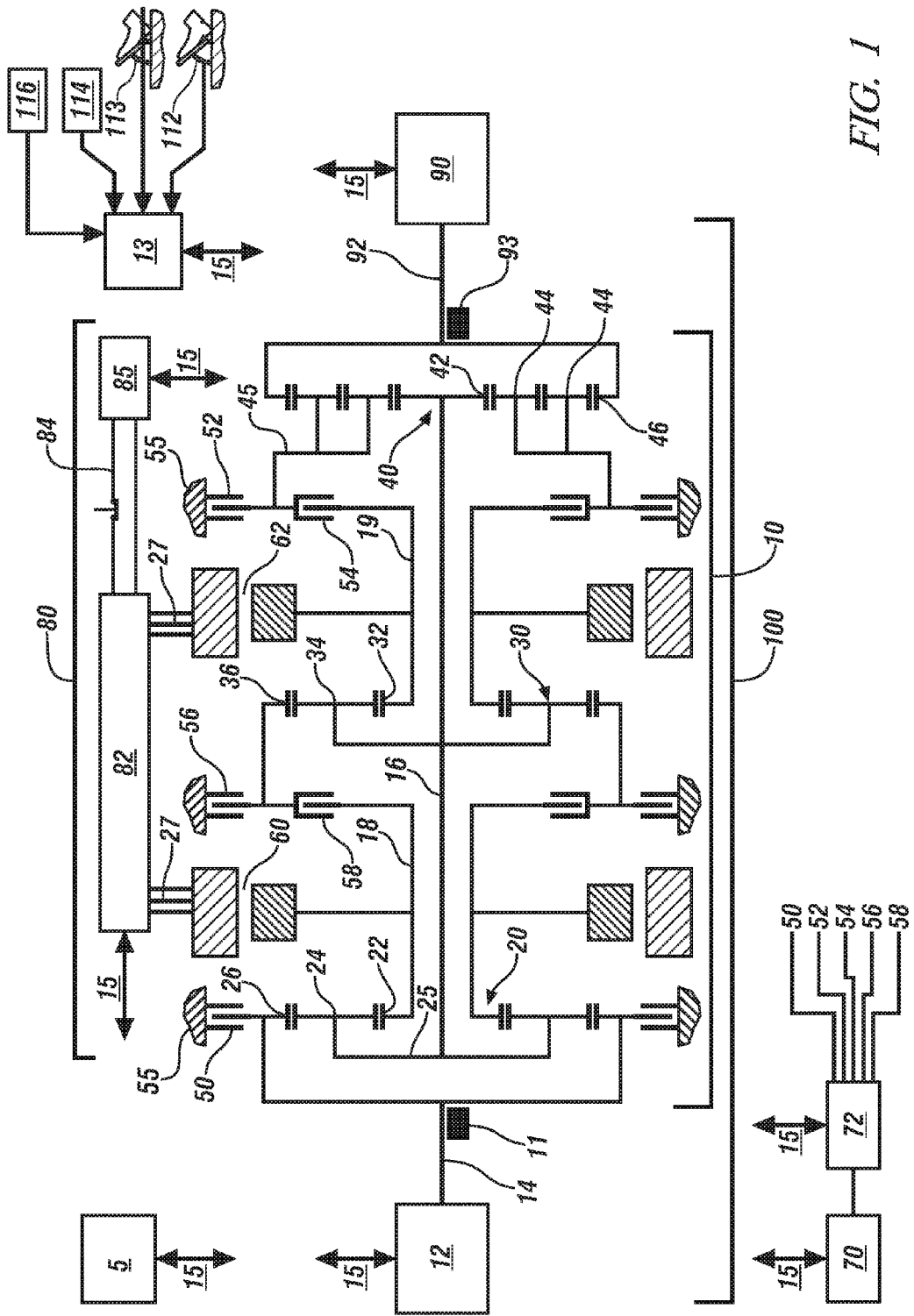
FIG. 1 illustrates a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque among the engine 12, the torque machines 60, 62, and the driveline 90. As illustrated, the first and second torque machines 60, 62 are electric motor/generators.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed and engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque among the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors output speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the battery 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the battery 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system, include commanding an output torque request and selecting a transmission range. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The operator-selectable positions of the transmission range selector 114 can correspond directly to individual transmission ranges described with reference to Table 1, or may correspond to subsets of the transmission ranges described with reference to Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning When the engine operates in the FCO state, it is spinning but is unfueled and not firing. The engine ON state may further include an all-cylinder state (ALL) wherein all cylinders are fueled and firing, and a cylinder deactivation state (DEAC) wherein a portion of the cylinders are fueled and firing and the remaining cylinders are unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 50, C2 52, C3 54, C4 56, and C5 58. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | | x | | |
| Neutral 3 | ON(ALL/DEAC/FCO)/OFF | | | | x | |
| PseudoGear 1 | ON(ALL/DEAC/FCO)/OFF | x | | | | |
| PseudoGear 2 | ON(ALL/DEAC/FCO)/OFF | | x | | | |
| Neutral | OFF | | | | | x |
| EVT Mode 1 | ON(ALL/DEAC/FCO)/OFF | x | | x | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | x | | | | x |
| EV Transitional State 2 | OFF | | | x | | x |
| Gear 1 | ON(ALL/DEAC/FCO) | x | | x | x | |
| Gear 2 | ON(ALL/DEAC/FCO) | x | x | | x | |
| Gear 3 | ON(ALL/DEAC/FCO) | | | x | x | x |
| EV1 | OFF | x | | | x | x |
| EV2 | OFF | x | | | x | x |
| EV3 | OFF | | | x | | x |
| EV4 | OFF | | | x | x | x |
| EV Transitional State 3 | OFF | x | x | | | x |
| Neutral | ON(ALL/DEAC/FCO)/OFF | | | x | x | |
| PseudoGear 3 | ON(ALL/DEAC/FCO)/OFF | x | x | | | |
| Neutral | OFF | | | x | | x |
| Neutral | OFF | | | | x | x |

The engine 12 operates in the ON state in one of the all-cylinder state and the cylinder deactivation state. The cylinder deactivation state is preferred during low engine load operating conditions to reduce pumping losses, thus reducing fuel consumption and emissions. Operation in the all-cylinder state is required at high engine load operating conditions to meet an output torque request.

A process for selecting one of the cylinder deactivation state and the all-cylinder state during ongoing operation of the powertrain system in a selected transmission range includes executing a first search to determine a first engine operating point and a corresponding first operating cost for operating in the all-cylinder state in response to an output torque request and the output speed of the transmission, and executing a second search to determine a second engine operating point and a corresponding second operating cost for operating in the cylinder deactivation state in response to the output torque request and the output speed of the transmission. The first and second searches are preferably executed concurrently. An arbitration/stabilization scheme is executed to select one of the first and second engine operating points as a preferred engine operating point and select one of the all-cylinder state and the cylinder deactivation state as a preferred state. The powertrain system is controlled including controlling the transmission in the selected transmission range, controlling the engine in the preferred state and controlling the engine at the preferred engine operating point. An exemplary control scheme for accomplishing this task is described with reference to FIG. 2.

Figures 1, 3:
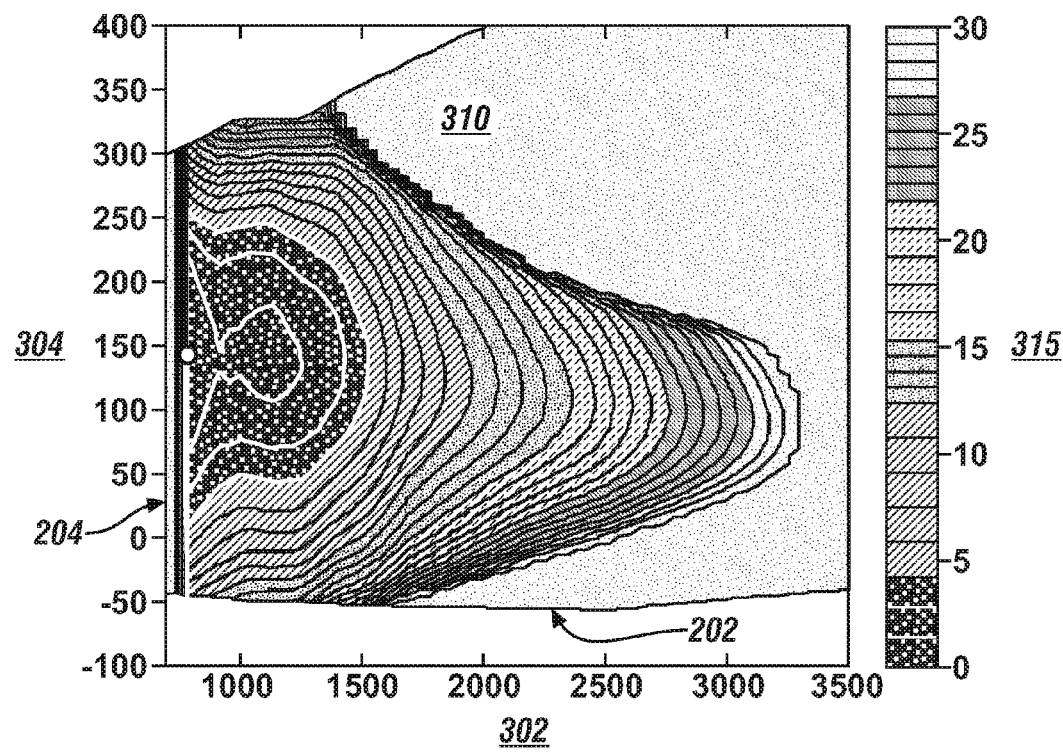
Figures 2, 3:
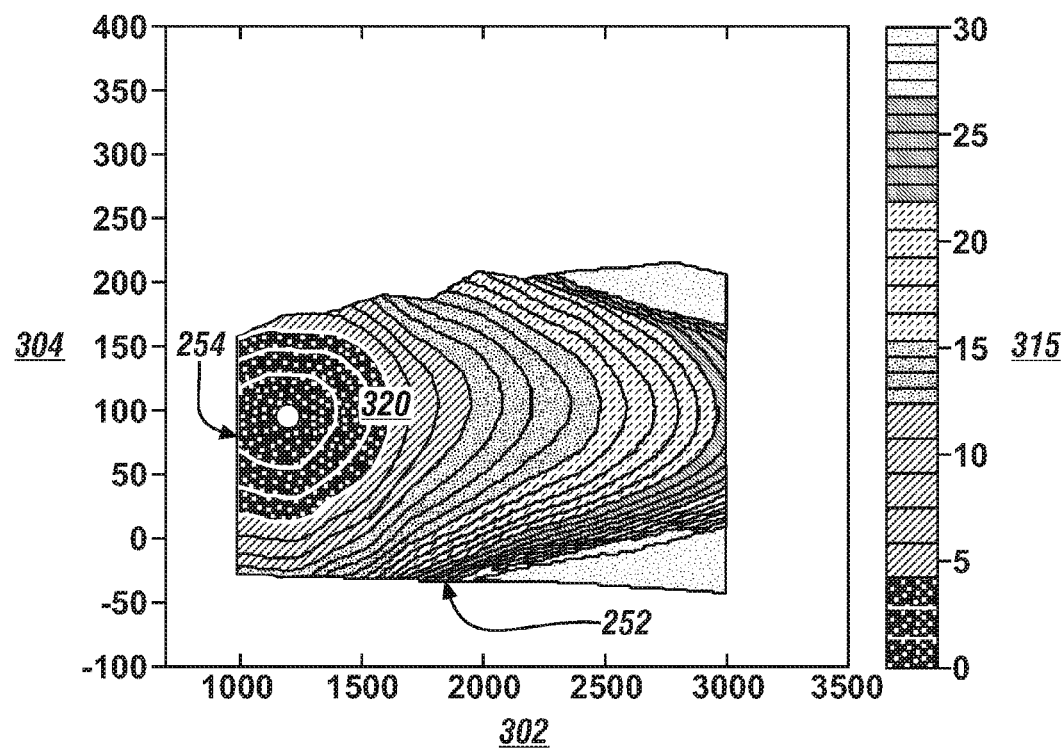

FIG. 2 schematically shows a process for evaluating operation of a multi-mode powertrain system including selecting and controlling an engine in one of the all-cylinder state and the cylinder deactivation state during ongoing operation. The process described with reference to FIG. 2 may be implemented to control operation of an embodiment of the multi-mode powertrain system 100 described with reference to FIG. 1, or another powertrain system having analogous functionality. Various elements of the process are implemented in a controller in a suitable form that may include hardware, algorithms, calibrations, or another suitable form without limitation. The process includes executing a first search 200 to determine a preferred all-cylinder engine operating point in response to an output torque request 206 and other system operating parameters 208 including the output speed. The preferred all-cylinder engine operating point includes a preferred all-cylinder engine speed 246 and a preferred all-cylinder engine torque 248, and a corresponding all-cylinder preferred cost 244. The process includes executing a second search 250 to determine a preferred cylinder deactivation engine operating point in response to the output torque request 206. The preferred cylinder deactivation engine operating point includes a preferred cylinder deactivation engine speed 286 and a preferred cylinder deactivation engine torque 288, and a corresponding cylinder deactivation preferred cost 284. The first search 200 and the second search 250 can be executed concurrently, or executed in a manner that yields the corresponding result during each loop cycle. An arbitration/stabilization scheme 290 selects one of the first and second engine operating points as a preferred engine operating point and selects one of the all-cylinder state and the cylinder deactivation state as a preferred state. The engine is operated at the selected one of the all-cylinder state and the cylinder deactivation state employing the preferred engine operating point 295 during an immediately subsequent loop cycle.

The first search 200 executes to determine the all-cylinder preferred cost 244 and the corresponding preferred all-cylinder engine operating point including the preferred all-cylinder engine speed 246 and preferred all-cylinder engine torque 248 in response to the output torque request 206 and the output speed, and includes as follows. An all-cylinder input speed range 202 and an all-cylinder input torque range 204 are determined, and encompass the operating space of the engine in the all-cylinder state. FIG. 3-1 graphically illustrates an all-cylinder speed/load space 310 for operating an embodiment of the engine 12 in the all-cylinder state, including the all-cylinder input speed range 202 and the all-cylinder input torque range 204. When operating in the all-cylinder state, the input speed range 202 traverses from engine idle speed, e.g., 800 to 1000 RPM, to a maximum achievable engine speed, i.e., redline. The maximum achievable engine speed is specific to an engine configuration and can be in the range of 5000 RPM to 8000 RPM. Similarly, the input torque range 204 traverses from a negative torque value associated with engine drag torque or pumping, e.g., −50 Nm, to a maximum engine torque output in response to high load operating conditions, e.g., >300 Nm in one embodiment. The maximum speed and torque values are provided for purposes of illustration. The all-cylinder input speed range 202 and input torque range 204 are provided as inputs to a first search engine 210.

The first search engine 210 preferably includes a two-dimensional search engine (search engine) 210 that iteratively generates a plurality of candidate engine speeds Ne(j) 212 across the all-cylinder input speed range 202 and a plurality of candidate engine torques Te(j) 214 across the all-cylinder engine torque range 204, each which is input to an iteration loop 220. The designation (j) indicates an individual iteration of the search engine 210. The iteration loop 220 includes a system torque optimization scheme 230 and a power cost model 240. The first search engine 210 employs a suitable search method to iteratively generate the plurality of candidate engine speeds Ne(j) 212 across the all-cylinder input speed range 202 and the plurality of candidate engine torques Te(j) 214 across the all-cylinder engine torque range 204. In one embodiment the candidate engine speeds Ne(j) 212 encompass input speeds of idle, 1500 RPM, 2000 RPM, 2500 RPM, 3000 RPM and 3500 RPM. In one embodiment the plurality of candidate engine torques Te(j) 214 encompass torques of −50 Nm, 0 Nm, 50 Nm, 100 Nm, 150 Nm, 250 Nm, and 300 Nm. In one embodiment the search engine 210 divides the input speed range 202 into a plurality of discrete engine speeds between idle and a maximum engine speed limit, and divides the input torque range 204 into a plurality of discrete engine torques between the minimum engine torque and the maximum engine torque, with the search scheme 200 executing at each of the discrete loads for each of the discrete speeds to identify the preferred all-cylinder engine speed 246 and the preferred all-cylinder engine torque 248.

The system torque optimization scheme 230 calculates a candidate powertrain operating point 232 including magnitudes of candidate torque commands for the first and second torque machines 60, 62 for controlling the powertrain system 100 in response to the output torque request 206 when the engine 12 is operating in the all-cylinder state at the candidate engine speed Ne(j) 212 and the candidate engine torque Te(j) 214.

The system torque optimization scheme 230 employs the candidate engine speed Ne(j) 212, the candidate engine torque T(j) 214, an output torque request 206, transmission range 207, and powertrain system operating parameters 208 to determine the candidate powertrain operating point 232, which is optimized for operating in one of the transmission ranges in the all-cylinder state. The transmission range 207 is a selected one of the transmission ranges described with reference to Table 1 for one embodiment of the powertrain system 100. The powertrain system operating parameters 208 include the output speed, and operating limits for the first and second torque machines 60, 62, e.g., minimum and maximum torques and minimum and maximum speeds, and operating limits for the battery 85, e.g., battery power limits including maximum discharge limits, maximum charge limits, and a present state of charge. The candidate powertrain operating point 232 includes preferred operating parameters for the first and second torque machines 60, 62, e.g., torque and speed, and preferred operating parameters for the battery 85, e.g., battery power, in response to the output torque request 206 when the engine is operating at the candidate engine speed Ne(j) 212 and the candidate engine torque T(j) 214, the transmission is operating in the selected transmission range 207, and the engine is in the all-cylinder state.

Figure 4:
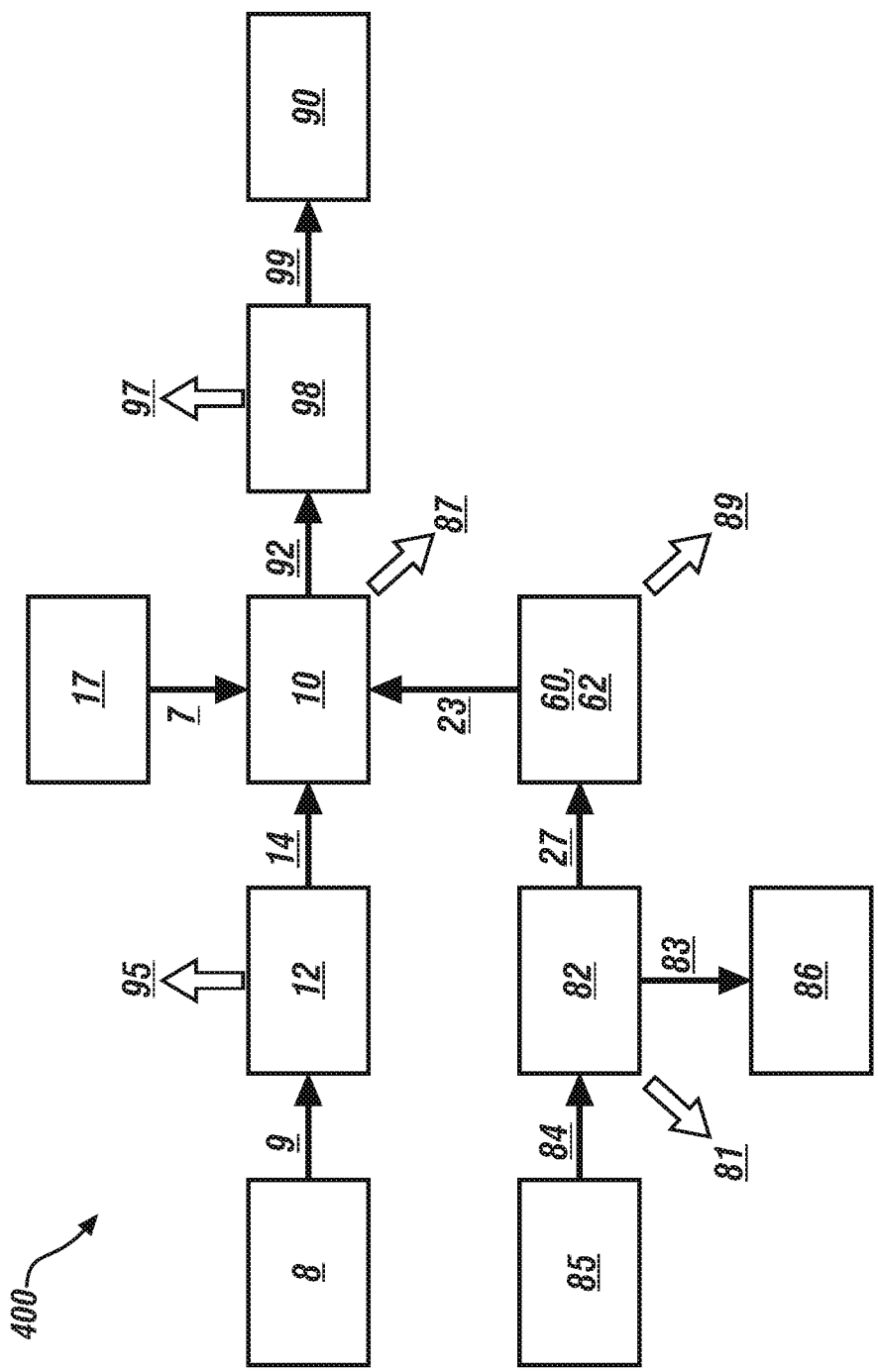
FIG. 4 illustrates an exemplary power cost function including an analytic framework for determining powertrain system operating costs, in accordance with the disclosure.

The power cost model 240 employs a power cost function to determine a candidate power cost Pcost(j) 242 for each candidate powertrain operating point 232 including magnitudes of candidate torque commands for the first and second torque machines 60, 62 for controlling the powertrain system 100 in response to the output torque request 206 when the engine 12 is operating in the all-cylinder state at the candidate engine speed Ne(j) 212 and the candidate engine torque Te(j) 214. FIG. 3-1 graphically shows exemplary powertrain operating costs 315 employed by the power cost model 240 of the first search 200 to determine a candidate power cost Pcost(j) 242 for a candidate powertrain operating point 232 including the engine 12 operating in the all-cylinder state at the candidate engine speed Ne(j) 212 and the candidate engine torque Te(j) 214 in response to the output torque request 206 and the output speed. FIG. 4 schematically shows an exemplary power cost function 400.

The second search 250 executes to determine the cylinder deactivation preferred cost 284 and the corresponding preferred cylinder deactivation engine speed 286 and preferred cylinder deactivation engine torque 288 in response to the output torque request 206 and the output speed, and includes as follows. A cylinder deactivation input speed range 252 and a cylinder deactivation input torque range 254 are determined, and encompass the operating range of the engine 12 in the cylinder deactivation state. FIG. 3-2 graphically illustrates a cylinder deactivation speed/load space 320 for operating an embodiment of the engine 12 in the cylinder deactivation state, including cylinder deactivation input speed range 252 and cylinder deactivation input torque range 254. When operating in the cylinder deactivation state, the input speed range 252 traverses from a minimum speed, e.g., 1000 RPM, and to a threshold cylinder deactivation engine speed, which is less than the maximum achievable engine speed in the all-cylinder state, and is specific to an engine configuration. As shown, the threshold cylinder deactivation engine speed is 3000 RPM. Similarly, the input torque range 254 traverses from a negative torque value associated with engine drag torque or pumping, e.g., −50 Nm, to a threshold cylinder deactivation engine torque output, e.g., 150 Nm in one embodiment. The threshold speed and torque values are provided for purposes of illustration. The cylinder deactivation input speed range 252 and cylinder deactivation input torque range 254 are provided as inputs to a second search engine 260.

The second search engine 260 is similar to the first search engine 210, and preferably includes a two-dimensional search engine (search engine) 260 that iteratively generates a plurality of candidate engine speeds Ne(k) 262 across the cylinder deactivation input speed range 252 and a plurality of candidate engine torques Te(k) 264 across the cylinder deactivation input torque range 254, each which is input to the iteration loop 265. The designation (k) indicates an individual iteration of the search engine 260. The second search engine 250 employs a suitable method to iteratively generate the plurality of candidate engine speeds Ne(k) 262 across the cylinder deactivation input speed range 252 and the plurality of candidate engine torques Te(k) 264 across the cylinder deactivation input torque range 254. The iteration loop 265 is structured similar to the iteration loop 220, including a system torque optimization scheme 270 and a power cost model 280. In one embodiment the candidate engine speeds Ne(k) 262 encompass input speeds of 1000 RPM, 1500 RPM, 2000 RPM, 2500 RPM, and 3000 RPM, and. In one embodiment the candidate engine torques Te(k) 264 encompass torques of −50 Nm, 0 Nm, 50 Nm, 100 Nm, and 150 Nm. The search engine 260 divides the input speed range 202 into a plurality of discrete engine speeds between the minimum and maximum speeds, and divides the input torque range 204 into a plurality of discrete engine torques between the minimum and maximum engine torques, with the search scheme 200 executing at each of the discrete loads for each of the discrete speeds to identify the preferred cylinder deactivation engine speed 286 and the preferred cylinder deactivation engine torque 288.

The system torque optimization scheme 270 calculates a candidate powertrain operating point 272 including magnitudes of candidate torque commands for the first and second torque machines 60, 62 for controlling the powertrain system 100 in response to the output torque request 206 and output speed when the engine 12 is operating in the cylinder deactivation state at the candidate engine speed Ne(k) 262 and the candidate engine torque Te(k) 264.

The system torque optimization scheme 270 employs the candidate engine speed Ne(k) 262, the candidate engine torque T(k) 264, the output torque request 206, transmission range 207, and powertrain system operating parameters 208 to determine an optimized candidate powertrain operating point 272 for operating in one of the transmission ranges in the cylinder deactivation state. The transmission range 207 corresponds to the transmission range selected for the first search 200. The powertrain system operating parameters 208 include the output speed, and operating limits for the first and second torque machines 60, 62, e.g., minimum and maximum torques and minimum and maximum speeds, and operating limits for the battery 85, e.g., battery power limits including maximum discharge limits, maximum charge limits, and a present state of charge. The optimized candidate powertrain operating point 282 includes preferred operating parameters for the first and second torque machines 60, 62, e.g., torque and speed, and preferred operating parameters for the battery 85, e.g., battery power, in response to the output torque request 206 when the engine is operating at the candidate engine speed Ne(k) 262 and the candidate engine torque T(k) 264, the transmission is operating in the selected transmission range 207, and the engine is in the cylinder deactivation state.

The power cost model 280 employs a power cost function to determine a candidate power cost Pcost(k) 282 for each candidate powertrain operating point 272 including magnitudes of candidate torque commands for the first and second torque machines 60, 62 for controlling the powertrain system 100 in response to the output torque request 206 when the engine 12 is operating in the cylinder deactivation state at the candidate engine speed Ne(k) 262 and the candidate engine torque Te(k) 264. FIG. 4 schematically shows the exemplary power cost function 400. FIG. 3-2 graphically shows exemplary powertrain operating costs 315 employed by the power cost model 280 of the second search 250 to determine the candidate power cost Pcost(k) 282 for a candidate powertrain operating point 272 including the engine 12 operating in the cylinder deactivation state at the candidate engine speed Ne(k) 262 and the candidate engine torque Te(k) 264 in response to the output torque request 206. FIG. 4 schematically shows the exemplary power cost function 400.

FIG. 3-1 graphically illustrates an all-cylinder speed/load space 310 for operating an embodiment of the engine 12 in the all-cylinder state, including the all-cylinder input speed range 202 and the all-cylinder input torque range 204 referenced in FIG. 2. Input speed is shown on the horizontal axis 302 and input torque is shown on the vertical axis 304. The all-cylinder speed/load space 310 includes a plurality of powertrain operating costs 315 ranging from relatively low cost (0) to relatively high cost (30). The powertrain operating costs 315 are determined using the power cost function 400 described with reference to FIG. 4. The powertrain operating costs 315 are employed by the power cost model 240 of the first search 200. The powertrain operating costs 315 are employed to determine the candidate power cost Pcost(j) 242 corresponding to each engine operating point including a candidate engine speed Ne(j) 212 and a candidate engine torque T(j) 214 when the engine is operating in the all-cylinder state.

FIG. 3-2 graphically illustrates a cylinder deactivation speed/load space 320 for operating an embodiment of the engine 12 in the cylinder deactivation state, including the cylinder deactivation input speed range 252 and the cylinder deactivation torque range 254 referenced in FIG. 2. Input speed is shown on the horizontal axis 302 and input torque is shown on the vertical axis 304. The cylinder deactivation speed/load space 320 includes a plurality of powertrain operating costs 315 ranging from relatively low cost (0) to relatively high cost (30). The powertrain operating costs 315 are employed to determine the candidate power cost Pcost(k) 282 corresponding to each engine operating point including a candidate engine speed Ne(k) 262 and a candidate engine torque T(k) 264 when the engine is operating in the cylinder deactivation state.

The arbitration/stabilization scheme 290 selects one of the first and second engine operating points as a preferred engine operating point and selects one of the all-cylinder state and the cylinder deactivation state as a preferred state during each loop cycle. The preferred engine operating point is the one of the preferred cylinder deactivation engine operating point and the preferred all-cylinder engine operating point that has a minimum cost, i.e., the minimum of the all-cylinder preferred cost 244 and the cylinder deactivation preferred cost 284. The stabilization scheme also controls operation to minimize shifting between the all-cylinder state and the cylinder deactivation state, employing hysteresis and other suitable techniques.

FIG. 4 schematically illustrates an exemplary power cost function 400 including an analytic framework for determining powertrain system operating costs, which is described with reference to the multi-mode powertrain system 100 described with reference to FIG. 1. Powertrain elements include engine 12, transmission 20, non-combustion torque machines 60, 62, battery 85, inverter 82, wheel brakes 98, driveline 90, and a fuel storage system 8. Pseudo-elements include an inertial load 17, which is an element constructed to account for system inertias, and high-voltage electrical load 86, which is an element constructed to account for high-voltage loads in the vehicle outside that load used for propulsion of the powertrain system 100. Power flow paths include a first power flow path 9 from the fuel storage system 8 to transfer fuel power to the engine 12, a second power flow path 14 between the engine 12 and the transmission 10, and third power flow path 84 between the battery 85 and the inverter 82, a fourth power flow path 83 between the inverter 82 and the high-voltage electrical load 86, and fifth power flow path 27 between the inverter 82 and the non-combustion torque machines 60, 62, a sixth power flow path 23 between the non-combustion torque machines 60, 62 and the transmission 10, and seventh power flow path 7 between the inertial load 17 and the transmission 20, an eighth power flow path 92 between the transmission 10 and the wheel brakes 98, and a ninth power flow path 99 between the wheel brakes 98 and the driveline 90. Power losses include engine power losses 95, battery power losses 81, mechanical power losses 87, electric motor losses 89, and brake power losses 97. The power cost inputs to the power cost function 400 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 95, electric motor power losses 89, battery power losses 81, brake power losses 97, and mechanical power losses 87 associated with operating the multi-mode powertrain at specific operating points for the engine 12 and the non-combustion torque machines 60, 62. The power cost function 400 may be employed to determine a total power cost for operating at a selected engine operating point over the range of engine operation. Exemplary results for the power cost function 400 are depicted with reference to FIGS. 3-1 and 3-2.

Such operation allows the control system to account for cylinder deactivation as a separate engine state, thus facilitating independent optimization of the all-cylinder state and the cylinder deactivation state. This operation improves search robustness for the all-cylinder state and the cylinder deactivation state, and can improve fuel economy, can be used with hysteresis to reduce busyness in shifting between the all-cylinder state and the cylinder deactivation state, and can be employed to introduce a bias in favor of operating in one of the states.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machines, and a driveline, the method comprising:
concurrently executing first and second searches in parallel, comprising:
the first search to determine a first engine operating point within an all-cylinder operating state space and a corresponding operating cost for operating the powertrain system in response to an output torque request, the all-cylinder operating state space defined by an all-cylinder input speed range and an all-cylinder input torque range, wherein the all-cylinder input speed range traverses from an engine idle speed to a maximum achievable engine speed; and
the second search to determine a second engine operating point within a cylinder deactivation state space and a corresponding operating cost for operating the powertrain system in response to the output torque request, the cylinder deactivation state space defined by a cylinder deactivation input speed range and a cylinder deactivation input torque range, wherein the cylinder deactivation input speed range traverses from a respective minimum engine speed that is greater than the engine idle speed to a threshold cylinder deactivation engine speed that is less than the maximum achievable engine speed;

selecting one of the first and second engine operating points as a preferred engine operating point based upon said operating costs; and controlling the engine at the preferred engine operating point in the corresponding one of the all-cylinder state and the cylinder deactivation state.

2. The method of claim 1, wherein executing the first search to determine the first engine operating point comprises:
iteratively generating candidate engine speeds across the all-cylinder input speed range and iteratively generating candidate engine torques across the all-cylinder engine torque range;
determining a candidate powertrain operating point for each of said candidate engine speeds and candidate engine torques;
determining a candidate power cost for each of the candidate powertrain operating points; and
selecting as the first engine operating point the candidate engine speed and candidate engine torque corresponding to a minimum of the candidate power costs.

3. The method of claim 2, wherein determining the candidate powertrain operating point for each of said candidate engine speeds and candidate engine torques comprises determining preferred operating parameters for the torque machines in response to the output torque request when the multi-mode transmission is operating in a selected transmission range.

4. The method of claim 1, wherein executing the second search to determine the second engine operating point comprises:
iteratively generating candidate engine speeds across the cylinder deactivation input speed range and iteratively generating candidate engine torques across the cylinder deactivation engine torque range;
determining a candidate powertrain operating point for each of said candidate engine speeds and candidate engine torques;
determining a candidate power cost for each of the candidate powertrain operating points; and
selecting as the second engine operating point the candidate engine speed and candidate engine torque corresponding to a minimum of the candidate power costs.

5. A method for operating a powertrain system including a multi-mode transmission configured to transfer torque among an engine, torque machines, and a driveline, the method comprising:
for a selected transmission range:
concurrently executing first and second searches in parallel, comprising:
the first search to determine a first engine operating point within an all-cylinder operating state space and a corresponding operating cost for operating the powertrain system in response to an output torque request, the all-cylinder operating state space defined by an all-cylinder input speed range and an all-cylinder input torque range, wherein the all-cylinder input speed range traverses from an engine idle speed to a maximum achievable engine speed; and the second search to determine a second engine operating point within a cylinder deactivation state space and a corresponding operating cost for operating the powertrain system in response to the output torque request, the cylinder deactivation state space defined by a cylinder deactivation input speed range and a cylinder deactivation input torque range, wherein the cylinder deactivation input speed range traverses from a respective minimum engine speed that is greater than the engine idle speed to a threshold cylinder deactivation engine speed that is less than the maximum achievable engine speed;

executing an arbitration scheme to select one of the first and second engine operating points as a preferred engine operating point; and controlling operation of the powertrain system comprising controlling the transmission in the selected transmission range and controlling the engine in the preferred engine operating point and controlling the engine in the corresponding one of the all-cylinder state and the cylinder deactivation state.

6. The method of claim 5, wherein executing the first search to determine the first engine operating point comprises:
iteratively generating candidate engine speeds across the all-cylinder input speed range and iteratively generating candidate engine torques across the all-cylinder engine torque range;
determining a candidate powertrain operating point for each of said candidate engine speeds and candidate engine torques;
determining a candidate power cost for each of said candidate powertrain operating points; and
selecting as the first engine operating point the candidate engine speed and candidate engine torque corresponding to a minimum of said candidate power costs.

7. The method of claim 6, wherein determining the candidate powertrain operating point for each of said candidate engine speeds and candidate engine torques comprises determining preferred operating parameters for the torque machines in response to the output torque request when the multi-mode transmission is operating in the selected transmission range.

8. The method of claim 5, wherein executing the second search to determine the second engine operating point comprises:
iteratively generating candidate engine speeds across the cylinder deactivation input speed range and iteratively generating candidate engine torques across the cylinder deactivation engine torque range;
determining a candidate powertrain operating point for each of said candidate engine speeds and candidate engine torques;
determining a candidate power cost for each of said candidate powertrain operating points; and
selecting as the second engine operating point the candidate engine speed and candidate engine torque corresponding to a minimum of the candidate power costs.

9. The method of claim 5, wherein controlling operation of the powertrain system comprises controlling the multi-mode transmission in the selected transmission range and controlling the engine in the preferred engine operating point and controlling the engine in the corresponding one of the all-cylinder state and the cylinder deactivation state during a subsequent loop cycle.

10. A method for operating a powertrain system including a multi-mode transmission configured to transfer torque among an engine, torque machines, and a driveline, the method comprising:

for a selected transmission range:
concurrently executing first and second searches in parallel, comprising:
the first search to determine a first engine operating point within an all-cylinder operating state space and a corresponding operating cost for operating the powertrain system in response to an output torque request, the all-cylinder operating state space defined by an all-cylinder input speed range and an all-cylinder input torque range, wherein the all-cylinder input speed range traverses from an engine idle speed to a maximum achievable engine speed; and the second search to determine a second engine operating point within a cylinder deactivation state space and a corresponding operating cost for operating the powertrain system in response to the output torque request, the cylinder deactivation state space defined by a cylinder deactivation input speed range and a cylinder deactivation input torque range, wherein the cylinder deactivation input speed range traverses from a respective minimum engine speed that is greater than the engine idle speed to a threshold cylinder deactivation engine speed that is less than the maximum achievable engine speed;

selecting one of the all-cylinder state and the cylinder deactivation state based upon the all-cylinder preferred cost and the cylinder deactivation preferred cost;

controlling operation of the powertrain system including controlling the engine at an engine operating point corresponding to the selected one of the all-cylinder state and the cylinder deactivation state.

11. The method of claim 10, wherein executing the first search to determine the all-cylinder preferred cost comprises:
iteratively generating candidate engine speeds across the all-cylinder input speed range and iteratively generating candidate engine torques across the all-cylinder engine torque range;
determining a candidate powertrain operating point for each of said candidate engine speeds and candidate engine torques;
determining a candidate power cost for each of said candidate powertrain operating points; and
selecting as the all-cylinder preferred cost a minimum of the candidate power costs.

12. The method of claim 10, wherein executing the second search to determine the cylinder deactivation preferred cost comprises:
iteratively generating candidate engine speeds across the cylinder deactivation input speed range and iteratively generating candidate engine torques across the cylinder deactivation engine torque range;
determining a candidate powertrain operating point for each of said candidate engine speeds and candidate engine torques;
determining a candidate power cost for each of said candidate powertrain operating points; and
selecting the cylinder deactivation preferred cost comprising a minimum of the candidate power costs.

* * * * *